(12) United States Patent
Tu et al.

(10) Patent No.: US 8,792,636 B2
(45) Date of Patent: Jul. 29, 2014

(54) PROTOCOL FOR PROTECTING CONTENT PROTECTION DATA

(75) Inventors: Van Quy Tu, Kitchener (CA); Herbert Anthony Little, Waterloo (CA); Kristof Takacs, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 311 days.

(21) Appl. No.: 12/870,053

(22) Filed: Aug. 27, 2010

(65) Prior Publication Data

US 2011/0211690 A1    Sep. 1, 2011

Related U.S. Application Data

(60) Provisional application No. 61/237,990, filed on Aug. 28, 2009.

(51) Int. Cl.
*G06F 21/00* (2013.01)

(52) U.S. Cl.
USPC ............................................ 380/44; 380/277

(58) Field of Classification Search
CPC . G06F 21/00; G06F 2221/2151; G06F 21/73; H04M 1/72522; H04M 1/72519; H04M 2250/64; H04W 12/04; H04L 9/0822; H04L 2463/062; H04L 9/3236; H04L 9/0825; H04L 9/0863; H04L 9/3226; H04L 9/0869
See application file for complete search history.

(56) References Cited

U.S. PATENT DOCUMENTS

| | | | | |
|---|---|---|---|---|
| 5,497,421 A | * | 3/1996 | Kaufman et al. | 713/156 |
| 6,389,535 B1 | | 5/2002 | Thomlinson et al. | |
| 8,126,145 B1 | * | 2/2012 | Tewari et al. | 380/255 |
| 2008/0040618 A1 | * | 2/2008 | Andersson et al. | 713/193 |
| 2008/0285748 A1 | * | 11/2008 | Lee et al. | 380/44 |
| 2012/0151219 A1 | | 6/2012 | Ryu et al. | |

FOREIGN PATENT DOCUMENTS

WO          9742732          11/1997

OTHER PUBLICATIONS http://www.truecrypt.org/docs/?s=version-history.
http://www.winmagic.com/product/securedoc_disk_encryption.
Mariggis, Athanasios, Extended European Search Report for EP 10174421.7, Oct. 12, 2012.
Savin, Daniela, First Office Action for CA 2,713,787, Apr. 15, 2013.

* cited by examiner

*Primary Examiner* — Michael S McNally
*Assistant Examiner* — Carlton Johnson
(74) *Attorney, Agent, or Firm* — Integral Intellectual Property Inc.; Miriam Paton

(57) ABSTRACT

Through the use of a one-time-use nonce, the transfer of cryptographic data over a potentially insecure link in a two-factor content protection system is avoided. The nonce may be stored encrypted with a public key from a smart card. A random key may be used to produce a storage key, which is used to encrypt a content protection key. The random key may be stored, encrypted with a key derived from the nonce. Instead of receiving a raw content protection key over the potentially insecure link, the raw nonce is received and, once used, replaced with a new nonce.

19 Claims, 6 Drawing Sheets

PROTOCOL FOR PROTECTING CONTENT PROTECTION DATA

CROSS-REFERENCE TO RELATED APPLICATIONS

The present application claims priority to U.S. Provisional Application Ser. No. 61/237,990 filed on Aug. 28, 2009, the contents of which are hereby incorporated herein by reference.

FIELD

The present application relates generally to content protection and, more specifically, to a protocol for protecting content protection data.

BACKGROUND

A one-factor authentication scheme may, for example, merely involve provision of a password to unlock a device or provide access to encrypted data. As an improvement over one-factor authentication schemes, a two-factor authentication scheme may involve evidence of something a user knows (e.g., a password) along with something of which the user is in possession (e.g., a smart card).

BRIEF DESCRIPTION OF THE DRAWINGS

Reference will now be made to the drawings, which show by way of example, embodiments of the present disclosure, and in which.

DETAILED DESCRIPTION OF THE EMBODIMENTS

Through the use of a one-time-use nonce, the transfer of cryptographic data over a potentially insecure link in a multi-factor content protection system is avoided.

According to an aspect of the present disclosure, there is provided, at an apparatus with a persistent memory, a method of facilitating multi-factor protection for at least some raw data stored in the persistent memory. The method comprises receiving a public cryptographic key from an external entity, the external entity storing a private cryptographic key corresponding to the public cryptographic key, generating a random key, generating a random nonce, generating, based on the random nonce, a derived key, encrypting, using the derived key, the random key, thereby producing an encrypted random key, storing, in the persistent memory, the encrypted random key, encrypting, using the public cryptographic key, the random nonce, thereby producing an encrypted nonce, receiving a device password for the apparatus, generating, based on the device password and the random key, a storage key, generating a content protection key, encrypting, using the content protection key, the raw data, thereby producing encrypted data, storing, in the persistent memory in place of the raw data, the encrypted data, encrypting, using the storage key, the content protection key, thereby producing an encrypted content protection key and storing, in the persistent memory, the encrypted content protection key. In other aspects of the present application, an apparatus is provided for carrying out this method and a computer readable medium is provided for adapting a processor in an apparatus to carry out this method.

Other aspects and features of the present invention will become apparent to those of ordinary skill in the art upon review of the following description of specific embodiments of the invention in conjunction with the accompanying figures.

Figure 1:
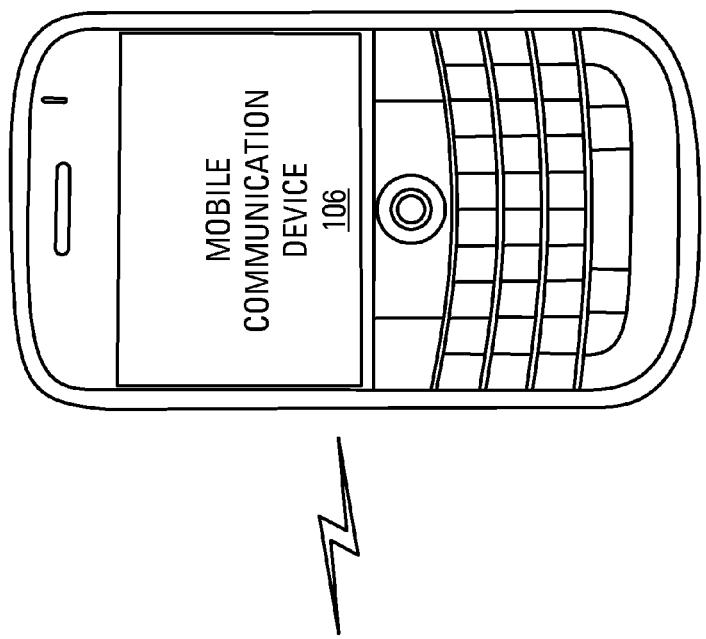
FIG. 1 illustrates an environment in which a smart card is illustrated along with a mobile communication device that communicates wirelessly with a smart card reader.
Figure 1:
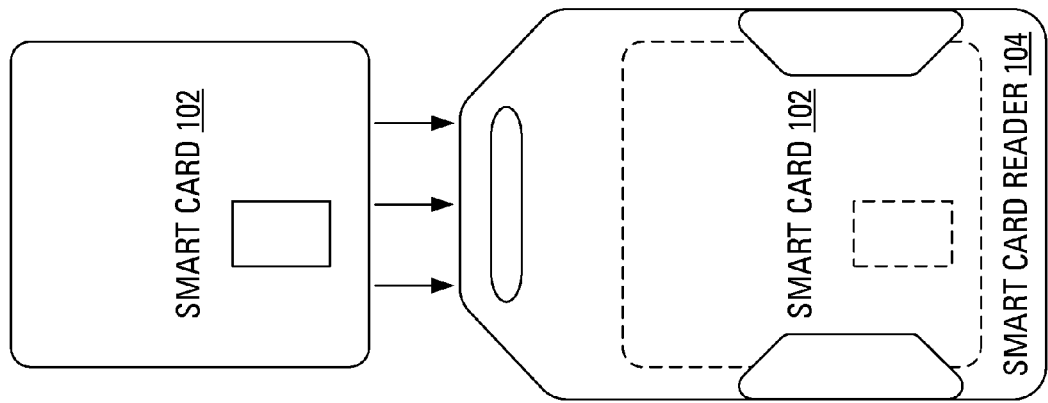

FIG. 1 illustrates an exemplary communication system 100 that includes a mobile communication device 106 that is enabled to communicate wirelessly with a peripheral device in the form of a smart card reader 104. A smart card 102 is illustrated as available for being received by the smart card reader 104. The smart card 102 may be considered to be an embodiment of an element that may, more generically, be referred to as an identity verification element.

Figure 2:
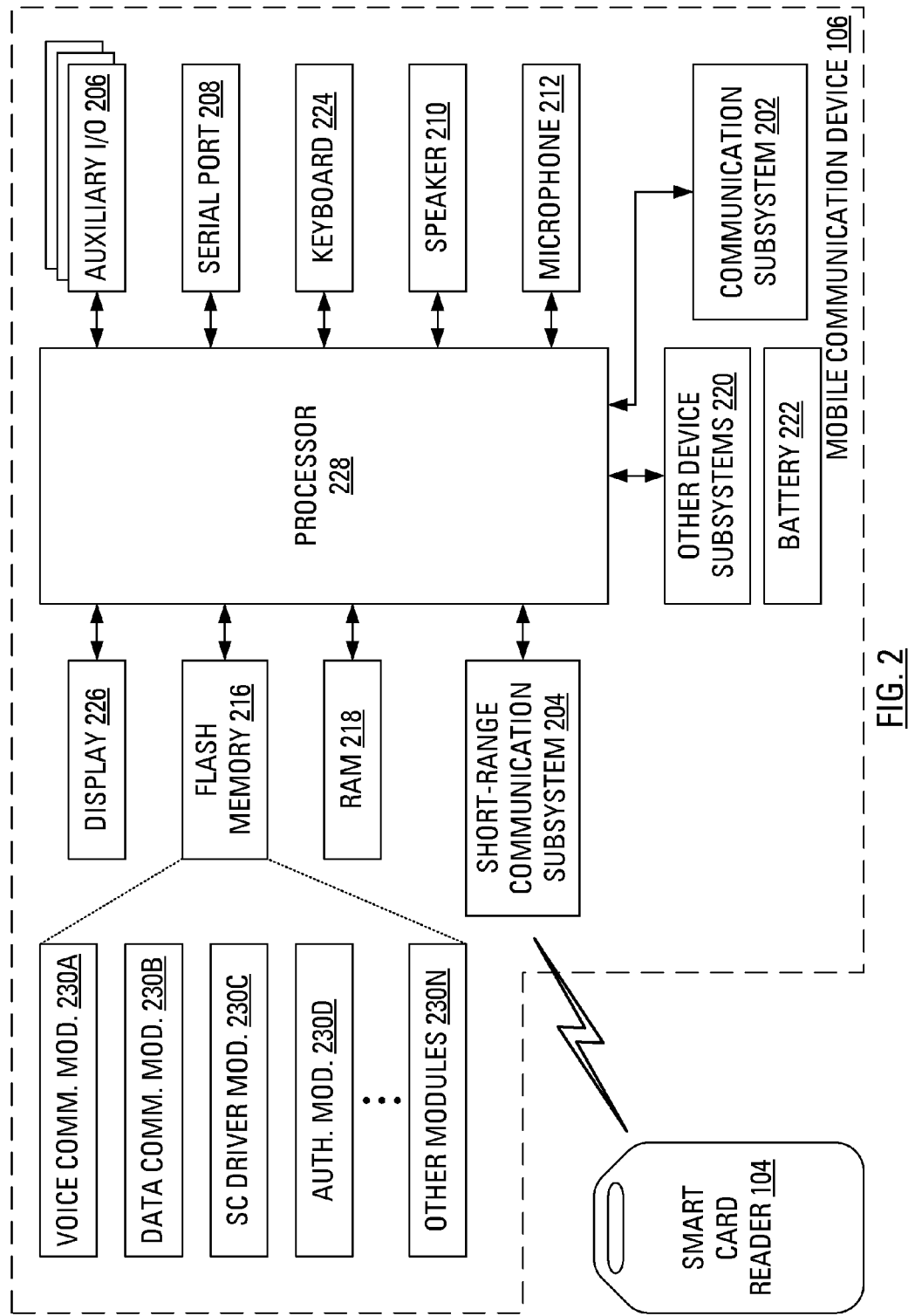
FIG. 2 schematically illustrates the mobile communication device of FIG. 1.

FIG. 2 illustrates the mobile communication device 106 including a housing, an input device (e.g., a keyboard 224 having a plurality of keys) and an output device (e.g., a display 226), which may comprise, for example, a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a mobile device processor 228) is shown schematically in FIG. 2 as coupled between the keyboard 224 and the display 226. The mobile device processor 228 controls the operation of the display 226, as well as the overall operation of the mobile communication device 106, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the mobile device processor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a mobile device Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the mobile device processor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the mobile device RAM 218. Communication signals received by the mobile device may also be stored to the mobile device RAM 218.

The mobile device processor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card (SC) driver module 230C may also be installed on the mobile communication device 106 during manufacture. Furthermore, an authentication module 230D may also be installed on the mobile communication device 106 to implement aspects of the present disclosure. As well, additional software modules, illustrated as another software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 where the smart card reader 104 also implements a Bluetooth™ communication module. As another example, the short-range communications subsystem 204 may include an infrared device to provide for communication with similarly-enabled systems and devices.

Figure 3:
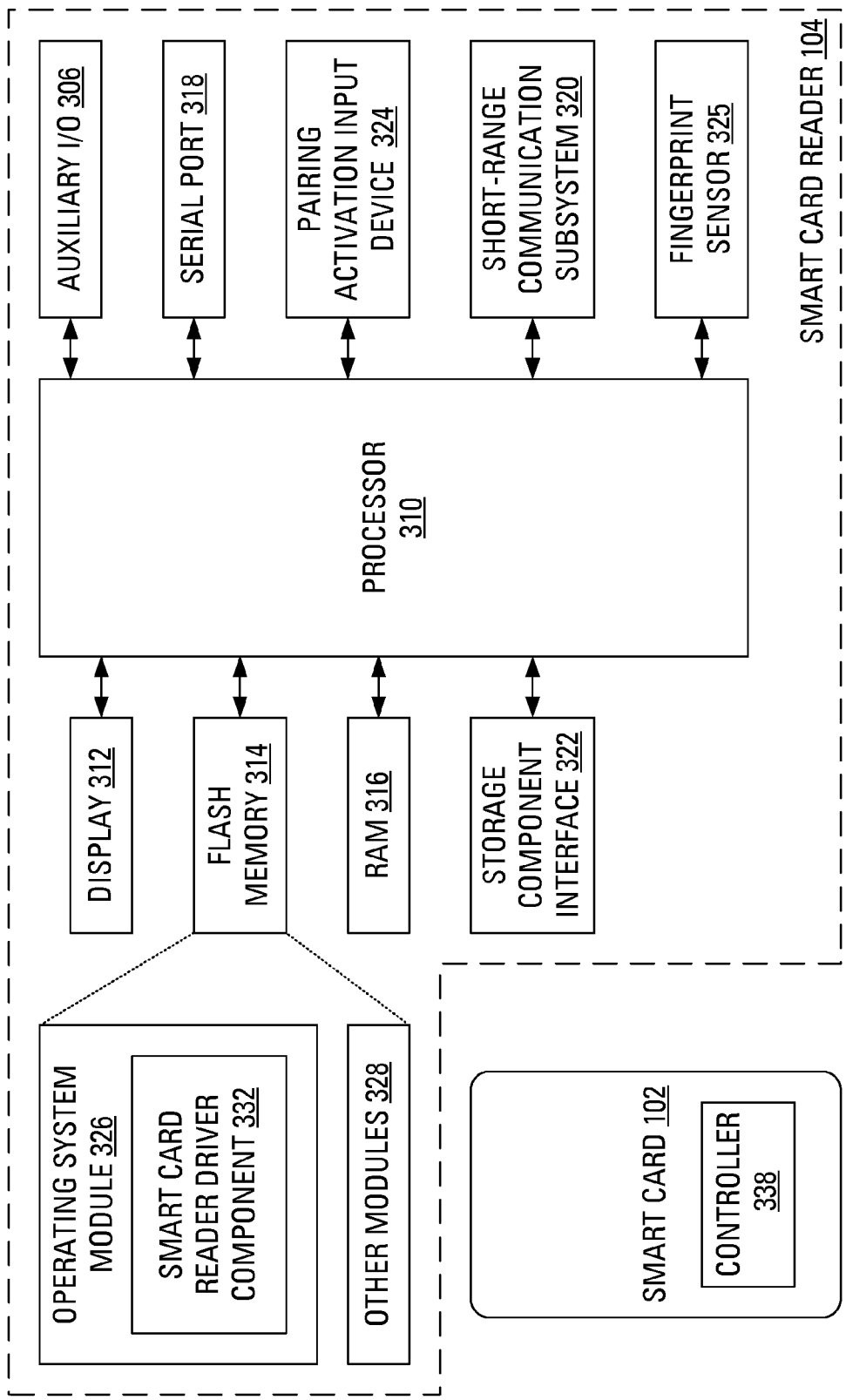
FIG. 3 schematically illustrates the smart card reader of FIG. 1.

FIG. 3 illustrates an example embodiment of the smart card reader 104. The smart card reader 104 includes a controller including at least one smart card reader processor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a smart card reader RAM 316, a serial port 318 (e.g., a Universal Serial Bus, or "USB", port), a smart card reader short-range communications subsystem 320 (e.g., an infrared transceiver, wireless bus protocol system using a protocol such as a Bluetooth™), a storage component interface 322 (e.g., for a memory card or any other data storage device) and a pairing-activation input device 324 (e.g., a push button). Optionally, the smart card reader 104 further includes a biometric information input device 325 (e.g., a fingerprint sensor). In some embodiments, the smart card reader RAM 316 includes a portion allocated to a data cache.

The smart card reader processor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card driver module 230C of the mobile communication device 106. Based on results of various communications with the smart card reader 104, the smart card driver module 230C maintains a record of the state of the smart card 102. The operating system module code 326, code for specific device application modules 328, code for the smart card reader driver component 332, or code components thereof, may be temporarily loaded into a volatile storage medium such as the smart card reader RAM 316. Received communication signals and other data may also be stored in the smart card reader RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader processor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code modules or components may then be installed by the user (or automatically) in the smart card reader RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 may be installed as one of the software applications 328 so long as suitable security related precautions are taken to ensure that the smart card reader driver component 332 cannot be modified or tampered with by unauthorized users.

The serial port 318 may be a USB-type interface port for interfacing or synchronizing with another device, such as a personal computer or the mobile communication device 106.

The serial port 318 is used to set preferences through an external device or software application or exchange data with a device, such as the mobile communication device 106. Such data may be stored on the smart card 120 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the mobile communication device 106 or personal computer and the smart card reader 104. In one embodiment, the short-range communications subsystem 320 employs an infrared communication link or channel. In another embodiment, the short-range communications subsystem 320 operates according to a wireless radio frequency bus protocol, such as Bluetooth™. However, the short-range communications subsystem 320 may operate according to any suitable local wired or wireless communication protocol, so long as the short-range communications subsystem 204 (FIG. 2) of the mobile communication device 106 operates using the same protocol, thereby facilitating wireless communication between the mobile communication device 106 and the smart card reader 104. Any communications mechanism and/or protocol may be implemented for the short-range communications subsystems 204, 320, so long as the mobile communication device 106 can communicate with the smart card reader 104 when the mobile communication device 106 is no more than a predetermined distance away from the smart card reader 104.

In one embodiment, the smart card 102 may be compliant with a Federal Information Processing Standards Publication (FIPS) standard. For example, FIPS 201 is a United States federal government standard that specifies Personal Identity Verification (PIV) requirements for Federal employees and contractors. It is forecast that Personal Identity Verification (PIV) Cards will be deployed to all US government employees (in the millions) over the next few years.

In operation, through interaction with a security user interface, the user establishes a device password to be used to unlock the mobile communication device 106. Additionally, the mobile device processor 228 may generate a content protection (CP) key using random data. The content protection key may be 256 bits in length and may be compatible with AES encryption.

Responsive to activation of content protection for some or all of the information stored in the flash memory 216, the mobile device processor 228 generates a cryptographic content protection (CP) key. An example content protection key may be generated according to the Advanced Encryption Standard (AES), announced by the US National Institute of Standards and Technology as Federal Information Processing Standards (FIPS) 197. In particular, a 256-bit AES content protection key may be considered suitable. The mobile device processor 228 may then use the content protection key to encrypt all, or portions, of the contents of the flash memory 216.

To protect the content protection key, the mobile device processor 228 may obtain a public key associated with a private key stored at the smart card 102, then use the public key of the smart card 102 to encrypt the content protection key and, subsequently, store the encrypted content protection key. For example, the mobile device processor 228 may store the encrypted content protection key in the non-volatile flash memory 216 in a predefined location.

At some later time, as an early step in obtaining access to protected content in the flash memory 216, the user establishes a communication coupling between the smart card 102 and the smart card reader 104. In some embodiments, the smart card 102 may be a so-called "contact" smart card, which is inserted into a physical interface of the smart card reader 104 to establish a communication coupling. In such a case, there is a physical coupling of the smart card 102 to the smart card reader 104. In other embodiments, the smart card 102 may be a so-called "contactless" smart card, for which a communication coupling to the smart card reader 104 may be established over a wireless interface. The user then establishes a communication coupling between the smart card reader 104 and the mobile communication device 106, if such a coupling has not already been established.

Coupling the smart card reader 104 to the mobile communication device 106 may include establishing a secure communication layer on top of the physical link between the smart card reader 104 and the mobile communication device 106, to ensure the confidentiality and authenticity of any data they exchange subsequently. However, the link between the smart card reader 104 and the mobile communication device 106 may not always be secure.

The user may then provide, in a user input interface of the mobile communication device 106, the previously established device password. The mobile communication device 106 may then communicate with the smart card reader 104 to determine whether the smart card 102 belongs to an authorized user of the mobile communication device 106. Upon determining that the smart card 102 belongs to an authorized user and determining that the user-entered device password is correct, the smart card 102 may be considered to be unlocked for use such that access to the private key stored on the smart card 102 is allowed.

The mobile communication device 106 sends the encrypted content protection key to the smart card 102 for decryption using the private key stored at the smart card 102. The smart card 102 uses the private key to decrypt the encrypted content protection key received from the mobile communication device 106 and transmits the decrypted content protection key to the mobile communication device 106. Upon receiving the decrypted content protection key, the mobile communication device 106 may store the decrypted content protection key in the RAM 218.

Later, the mobile communication device 106 may use the decrypted content protection key to decrypt portions of the protected data responsive to user control.

Upon locking of the mobile communication device 106, either responsive to a time-out related to a lack of activity or responsive to deliberate user control, the mobile device processor 228 may erase the decrypted content protection key from the RAM 218.

As in evidence above, in at least one method for decrypting an encrypted content protection key, so that the decrypted content protection key may be used to decrypt protected data on the mobile communication device 106, there is a transfer of useful data (e.g., the decrypted content protection key) over a channel between the mobile communication device 106 and the smart card reader 104. Although, as described, the channel between the mobile communication device 106 and the smart card reader 104 is defined as being secure, such may not always be the case.

Indeed, transmission of the raw, decrypted content protection key between the multi-factor entities (e.g., the mobile communication device 106 and the smart card reader 104) may pose a disadvantage when only insecure communication channels are available. In such a case, an eavesdropper could intercept sensitive information (e.g., the raw, decrypted content protection key) and the intercepted information may allow the eavesdropper to decrypt data on the mobile communication device 106.

In overview, an implementation of a two-factor content protection solution is proposed herein using insecure communication channels.

Figure 4:
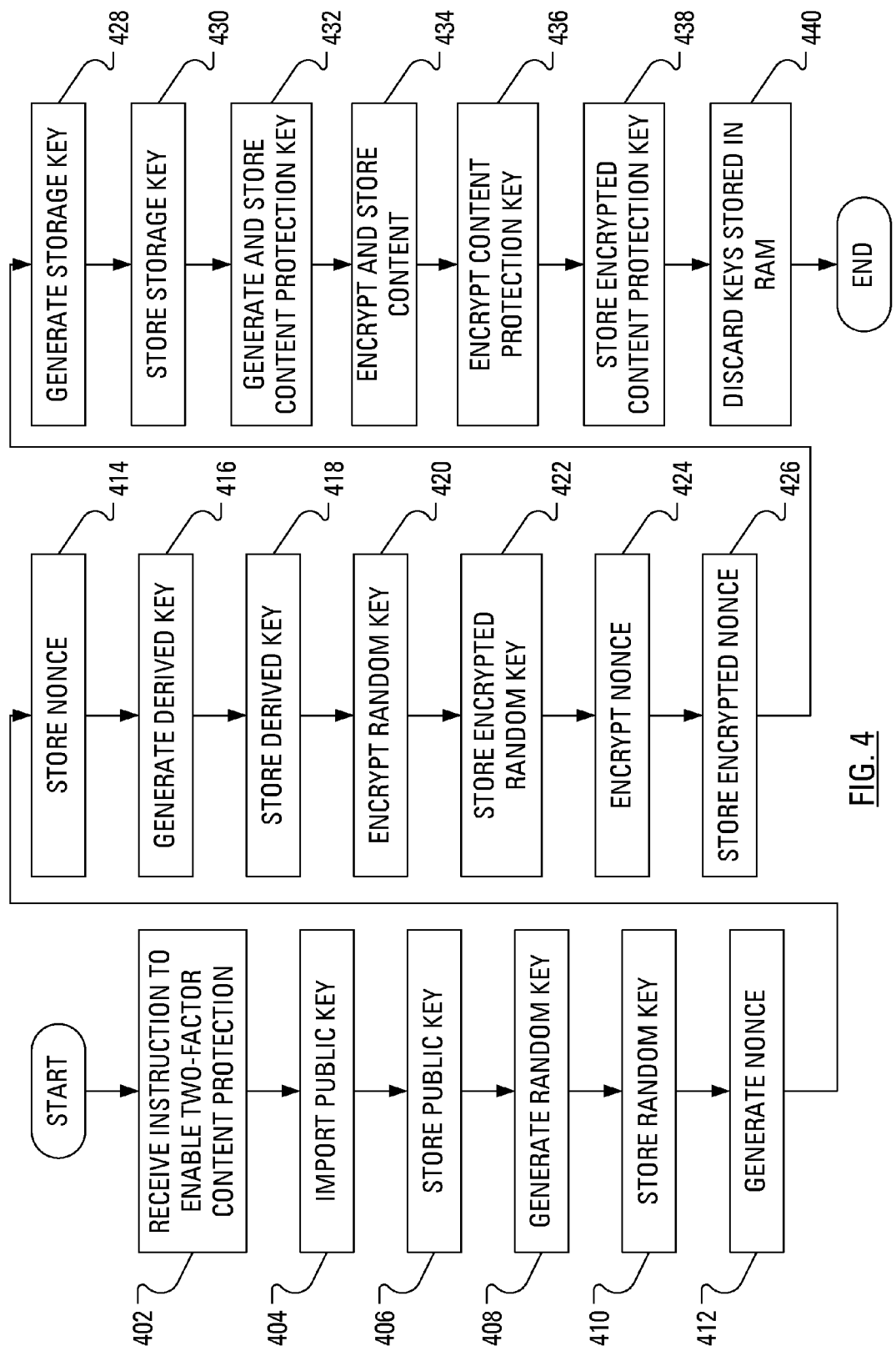
FIG. 4 illustrates example steps in a method of protecting content stored on the mobile communication device of FIG. 1, where the method includes generating a nonce and a random key according to an embodiment of the present disclosure.

FIG. 4 illustrates example steps in a method of protecting content stored on the mobile communication device 106. Initially, the mobile device processor 228 may receive (step 402) an instruction to enable two-factor content protection. Responsively, the mobile device processor 228 may arrange communication with the smart card reader 104 to import (step 402), from the smart card 102, a public key (PU) corresponding to a private key (PR) stored on the smart card 102. The mobile device processor 228 may then store (step 406) the public key (PU) in the flash memory 216. Notably, the private key (PR) may not be imported from the smart card 102 as the private key (PR) is protected by the smart card 102 and cannot be exported.

The mobile device processor 228 may then generate (step 408) a random key (K1) and associate the random key uniquely with the smart card 102 and the smart card reader 104. The mobile device processor 228 may then store (step 410) the random key (K1) in the RAM 218.

The mobile device processor 228 may then generate (step 412) a random nonce (N1). The mobile device processor 228 may then store (step 414) the random nonce (N1) in the RAM 218.

The mobile device processor 228 may then generate (step 416) a derived key (KN1). In particular, generating the derived key (KN1) may involve determining a hash of the random nonce (N1) using a secure hashing algorithm (H1). The mobile device processor 228 may then store (step 418) the derived key (KN1) in the RAM 218.

The mobile device processor 228 may then encrypt (step 420) the random key (K1). In particular, the encryption of the random key (K1) may be accomplished using a secure symmetric encryption algorithm (E1) with the derived key (KN1). The mobile device processor 228 may then store (step 422) the encrypted random key (K1) in the flash memory 216.

The mobile device processor 228 may then encrypt (step 424) the random nonce (N1). In particular, the encryption of the random nonce (N1) may be accomplished using the public key (PU). The mobile device processor 228 may then store (step 426) the encrypted random nonce (N1) in the flash memory 216.

The mobile device processor 228 may then generate (step 428) a storage key (KS). In particular, the generation of the storage key (KS) may involve use of the device password along with the random key (K1) in a relationship such as KS=KDF1 (device password, K1), where KDF1 is a Key Derivation Function that adheres to the known Password-Based Cryptography Standard (PKCS#5, for more information, see www.rsa.com) with K1 and the device password as the shared secret. The mobile device processor 228 may then store (step 430) the storage key (KS) in the RAM 218.

The mobile device processor 228 may then generate and store (in the RAM 218) (step 432) a content protection key (KCP). The mobile device processor 228 may then encrypt (step 434) the content in the flash memory 216 for which content protection is required. In particular, the encryption of the content may be accomplished using the secure symmetric encryption algorithm (E1) with the content protection key (KCP). Additionally, the encrypted content may be stored in place of the original non-encrypted content.

The mobile device processor 228 may then encrypt (step 436) the content protection key (KCP). In particular, the encryption of the content protection key (KCP) may be accomplished using the secure symmetric encryption algorithm (E1) with the storage key (KS). The mobile device processor 228 may then store (step 438) the encrypted content protection key (EKCP) in the flash memory 216.

The mobile device processor 228 may then discard (step 440) the contents of the RAM 218. That is, the mobile device processor 228 may discard the stored values of the random key (K1), the random nonce (N1), the derived key (KN1) and the storage key (KS).

In summary, the encrypted random key (K1), the encrypted random nonce (N1) and the encrypted content protection key (EKCP) are all stored in persistent memory (e.g., the flash memory 216), while the various keys used in generating other keys are temporarily stored in the RAM 218 and then discarded when no longer useful.

At some later time, the user of the mobile communication device 106 may wish access to the protected content. Accordingly, the mobile device processor 228 will arrange recovery of the content protection key (KCP).

Figure 5:
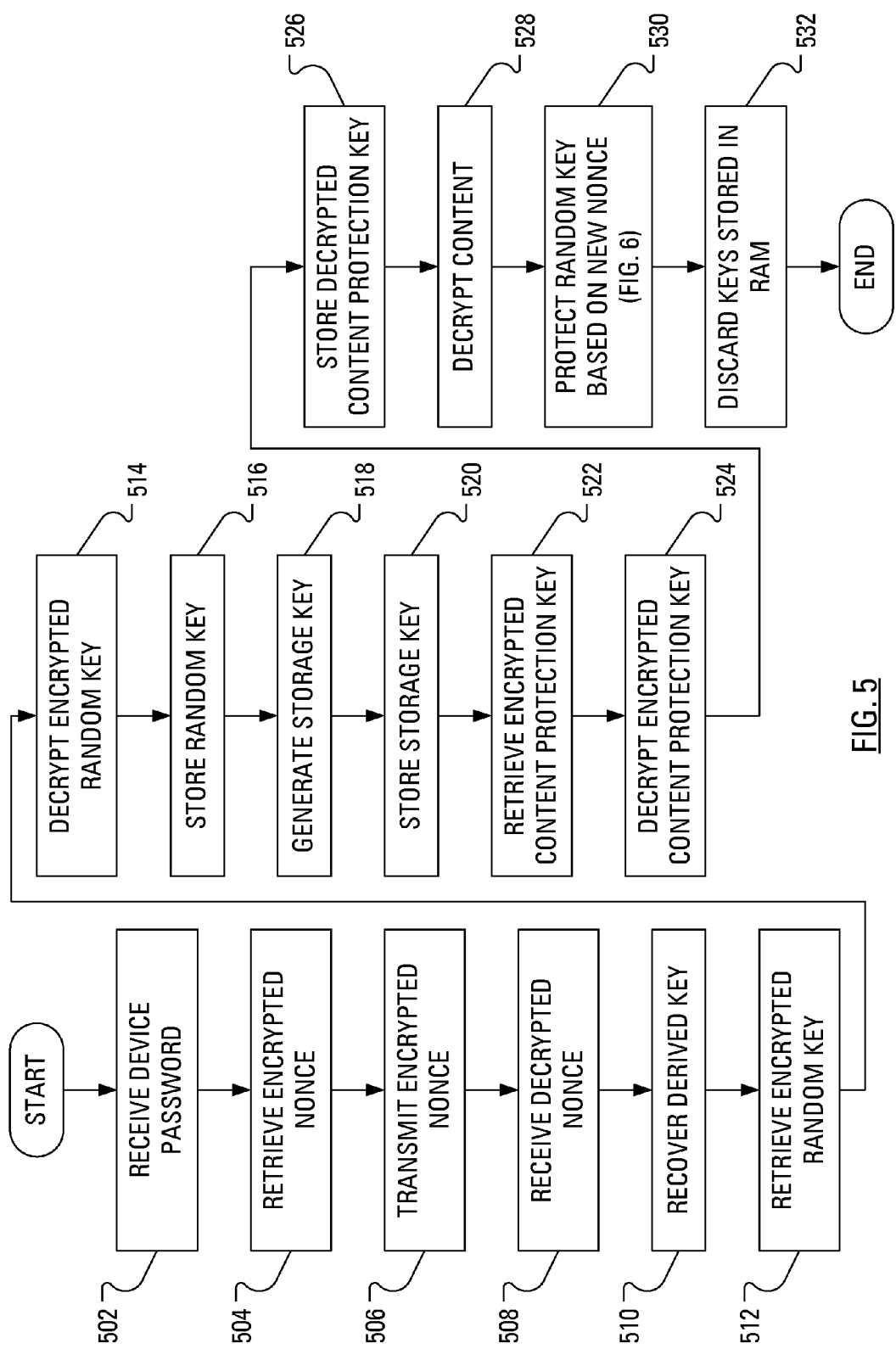
FIG. 5 illustrates example steps in a method of gaining access to protected content stored on the mobile communication device of FIG. 1, according to an embodiment of the present disclosure.

FIG. 5 illustrates example steps in a method of gaining access to protected content. Initially, the mobile device processor 228 receives (step 502) a device password, as entered by the user.

Responsive to receiving the device password, the mobile device processor 228 retrieves (step 504) the encrypted random nonce (N1) from the flash memory 216. The mobile device processor 228 then transmits (step 506) the encrypted random nonce (N1) to the smart card reader 104 so that the encrypted random nonce (N1) can be decrypted by the smart card 102.

The mobile device processor 228 then receives (step 508) the decrypted random nonce (N1) from the smart card reader 104, possibly over an insecure channel. The mobile device processor 228 then recovers (step 510) the derived key (KN1). In particular, the mobile device processor 228 generates a hash of the decrypted random nonce (N1) using the secure hashing algorithm (H1).

Responsive to recovering the derived key (KN1), the mobile device processor 228 retrieves (step 512) the encrypted random key (K1). The mobile device processor 228 may then decrypt (step 514) the encrypted random key (K1). In particular, decryption of the encrypted random key (K1) involves using the secure symmetric encryption algorithm (E1) with the recovered derived key (KN1). The mobile device processor 228 may then store (step 516) the decrypted random key (K1) in the RAM 218.

The mobile device processor 228 may then generate (step 518) the storage key (KS). In particular, just as in step 428 of the method of FIG. 4, the generation of the storage key (KS) may involve use of the device password along with the decrypted random key (K1). The mobile device processor 228 may then store (step 520) the storage key (KS) in the RAM 218.

Responsive to generating the storage key (KS), the mobile device processor 228 retrieves (step 522) the encrypted content protection key (EKCP). The mobile device processor 228 may then decrypt (step 524) the encrypted content protection key (EKCP). In particular, decryption of the encrypted content protection key (EKCP) involves using the secure symmetric encryption algorithm (E1) with the storage key (KS) generated in step 518. The mobile device processor 228 may then store (step 526) the decrypted content protection key (KCP) in the RAM 218.

The mobile device processor 228 may then decrypt (step 528) the desired content using the decrypted content protection key (KCP).

Figure 6:
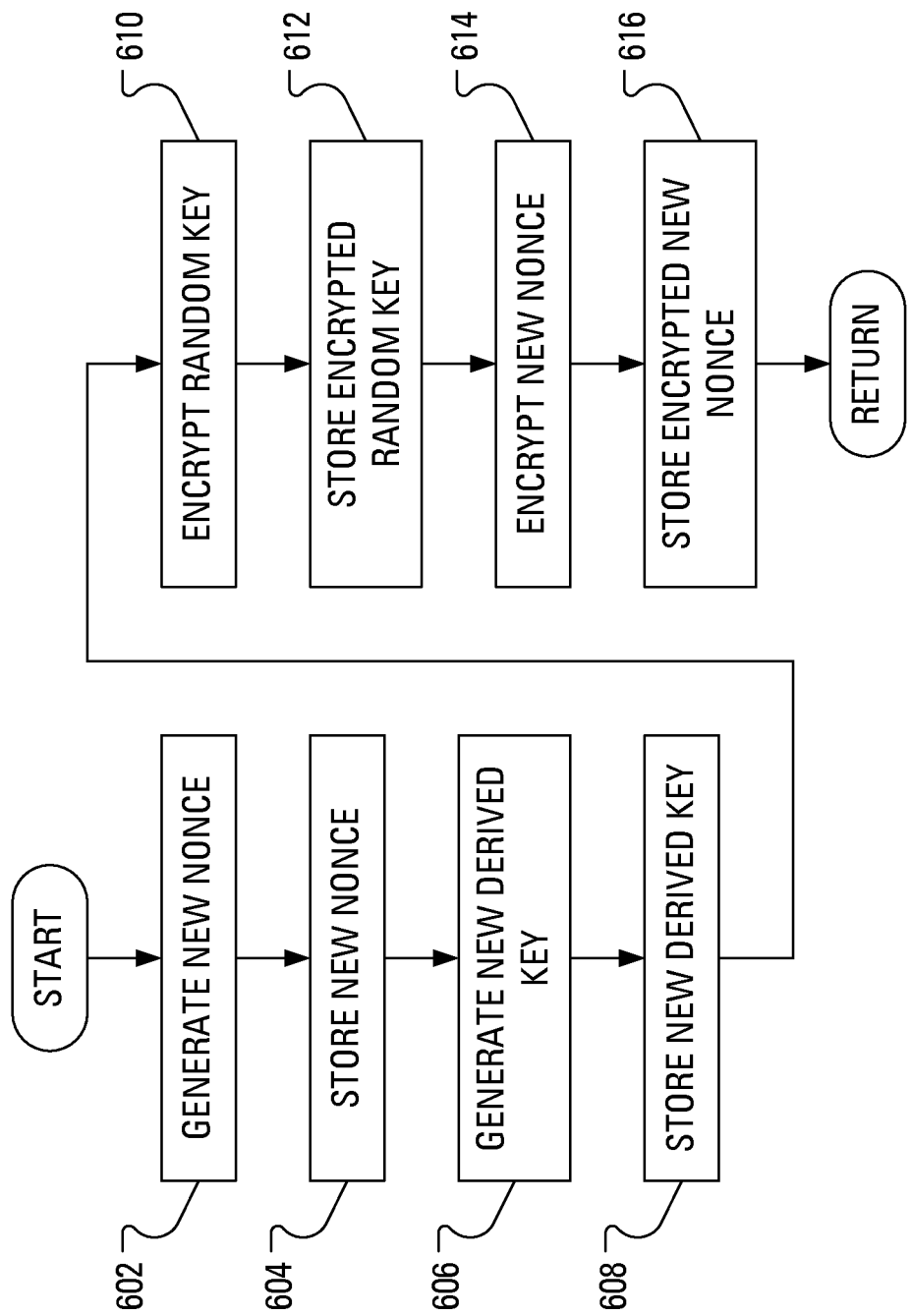
FIG. 6 illustrates example steps of protecting the random key using a new nonce, according to an embodiment of the present disclosure.

The mobile device processor 228 may then protect (step 530) the random key (K1) using a new nonce. FIG. 6 illustrates example steps of protecting (step 530) the random key (K1) using a new nonce. Initially, the mobile device processor 228 may generate (step 602) a new random nonce (N2). The mobile device processor 228 may then store (step 604) the new random nonce (N2) in the RAM 218.

The mobile device processor 228 may then generate (step 606) a new derived key (KN2). In particular, generating the new derived key (KN2) may involve determining a hash of the new random nonce (N2) using the secure hashing algorithm (H1). The mobile device processor 228 may then store (step 608) the new derived key (KN2) in the RAM 218.

The mobile device processor 228 may then encrypt (step 610) the random key (K1). In particular, the encryption of the random key (K1) may be accomplished using the secure symmetric encryption algorithm (E1) with the new derived key (KN2). The mobile device processor 228 may then store (step 612) the encrypted random key (K1) in the flash memory 216.

The mobile device processor 228 may then encrypt (step 614) the random nonce (N2). In particular, the encryption of the new random nonce (N2) may be accomplished using the public key (PU). The mobile device processor 228 may then store (step 616) the encrypted new random nonce (N2) in the flash memory 216.

The mobile device processor 228 may then discard (step 532) the contents of the RAM 218. That is, the mobile device processor 228 may discard the stored values of the random key (K1), the old random nonce (N1), the old derived key (KN1), the new random nonce (N2), the new derived key (KN2) and the storage key (KS)

Note that the mobile device processor 228 discards the content protection key (KCP) whenever the mobile communication device 106 is locked.

The proposed solution allows for the use of an insecure communication channel between the mobile communication device 106 and the smart card reader 104 because the raw content protection key (KCP) never leaves the mobile communication device 106 and because of the nature of the nonce values selected. In particular, each nonce is only used exactly once. Furthermore, a given nonce is only available in its raw form when the smart card reader is transmitting the given nonce to the mobile communication device 106. In the event that an eavesdropper intercepts the given nonce, the eavesdropper will not be able to use the given nonce in a replay attack, since the mobile communication device 106 will have already transitioned to a new nonce.

It should be noted that the proposed solution is not limited to the use of a smart card/smart card reader. The solution can be applied to any scenario where the external entity utilizes a public/private key pair where the public key can be stored locally on the mobile communication device 106. Furthermore, a person of ordinary skill in the art would understand that aspects of the present disclosure are not limited to a mobile communication device. Instead, the present disclosure may be applied to smart phones, personal digital assistants, desktop computers, notebook computers, netbook computers, digital media players, gaming consoles, portable global position system receivers, cable television set top boxes, and other devices with persistent memory and cause to utilize a public/private key pair where the public key can be stored locally.

Moreover, various aspects of the present disclosure apply to multi-factor content protection, involving two or more factors.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. At an apparatus with a persistent memory, a method of facilitating multi-factor protection for at least some raw data stored in said persistent memory, said method comprising:
   receiving a public cryptographic key from an external entity, said external entity storing a private cryptographic key corresponding to said public cryptographic key;
   generating a random key;
   generating a random nonce;
   generating, based on said random nonce, a derived key;
   encrypting, using said derived key, said random key, thereby producing an encrypted random key;
   storing, in said persistent memory, said encrypted random key;
   encrypting, using said public cryptographic key, said random nonce, thereby producing an encrypted nonce;
   storing, in said persistent memory, said encrypted nonce;
   establishing a device password for said apparatus;
   generating, based on said established device password and said random key, a storage key;
   generating a content protection key;
   encrypting, using said content protection key, said raw data, thereby producing encrypted data;
   storing, in said persistent memory in place of said raw data, said encrypted data;
   encrypting, using said storage key, said content protection key, thereby producing an encrypted content protection key; and
   storing, in said persistent memory, said encrypted content protection key.

2. The method of claim 1 further comprising associating said random key uniquely with said external entity.

3. The method of claim 1 wherein said generating said derived key comprises determining a hash of said random nonce.

4. The method of claim 1 wherein said encrypting said random key comprises using a secure symmetric encryption algorithm.

5. The method of claim 2 wherein said external entity comprises a smart card.

6. The method of claim 1 further comprising:
   retrieving said encrypted nonce from said persistent memory;
   transmitting said encrypted nonce to said external entity;
   receiving said nonce from said external entity;
   generating, based on said received nonce, said derived key;
   retrieving said encrypted random key from said persistent memory;
   decrypting, using said derived key generated based on said received nonce, said encrypted random key, thereby producing a decrypted random key;
   generating, using said decrypted random key, said storage key;
   retrieving said encrypted content protection key from said persistent memory;
   decrypting, using said storage key generated based on said decrypted random key, said encrypted content protection key, thereby producing said content protection key; and decrypting, using said content protection key, said encrypted data, thereby producing said raw data.

7. The method of claim 6 wherein said generating said derived key based on said received nonce comprises generating a hash of said received nonce.

8. The method of claim 6 further comprising:
receiving a device password for said apparatus; and
wherein said generating, using said decrypted random key, said storage key is further based on said device password.

9. The method of claim 6 further comprising:
generating a new nonce; and
protecting, based on said new nonce, said random key.

10. The method of claim 9 further comprising generating, based on said new nonce, a new derived key.

11. The method of claim 10 further comprising encrypting, using said new derived key, said random key, thereby producing a new encrypted random key.

12. The method of claim 9 further comprising encrypting, using said public cryptographic key, said new nonce, thereby producing an encrypted new nonce.

13. An apparatus comprising:
a persistent memory storing raw data; and
a processor operable:
to receive a public cryptographic key from an external entity, said external entity storing a private cryptographic key corresponding to said public cryptographic key;
to generate a random key;
to generate a random nonce;
to generate, based on said random nonce, a derived key;
to encrypt, using said derived key, said random key, thereby producing an encrypted random key;
to store, in said persistent memory, said encrypted random key;
to encrypt, using said public cryptographic key, said random nonce, thereby producing an encrypted nonce;
to store, in said persistent memory, said encrypted nonce;
to establish a device password for said apparatus;
to generate, based on said established device password and said random key, a storage key;
to generate a content protection key;
to encrypt, using said content protection key, said raw data, thereby producing encrypted data;
to store, in said persistent memory in place of said raw data, said encrypted data;
to encrypt, using said storage key, said content protection key, thereby producing an encrypted content protection key; and
to store, in said persistent memory, said encrypted content protection key.

14. The apparatus of claim 13 wherein said apparatus is a smart phone.

15. The apparatus of claim 13 wherein said apparatus is a personal digital assistant.

16. The apparatus of claim 13 wherein said apparatus is a desktop computing device.

17. The apparatus of claim 13 wherein said apparatus is a notebook computing device.

18. The apparatus of claim 13 wherein said apparatus is a digital media player.

19. A non-transitory computer-readable medium containing computer-executable instructions that, when performed by a processor for facilitating multi-factor protection for at least some raw data stored in a persistent memory, cause said processor:
to receive a public cryptographic key from an external entity, said external entity storing a private cryptographic key corresponding to said public cryptographic key;
to generate a random key;
to generate a random nonce;
to generate, based on said random nonce, a derived key;
to encrypt, using said derived key, said random key, thereby producing an encrypted random key;
to store, in said persistent memory, said encrypted random key;
to encrypt, using said public cryptographic key, said random nonce, thereby producing an encrypted nonce;
to store, in said persistent memory, said encrypted nonce;
to establish a device password for an apparatus;
to generate, based on said established device password and said random key, a storage key;
to generate a content protection key;
to encrypt, using said content protection key, said raw data, thereby producing encrypted data;
to store, in said persistent memory in place of said raw data, said encrypted data;
to encrypt, using said storage key, said content protection key, thereby producing an to encrypted content protection key; and
to store, in said persistent memory, said encrypted content protection key.

* * * * *